United States Patent
Gonzaga (10) Patent No.: US 7,188,656 B2
(45) Date of Patent: Mar. 13, 2007

(54) AUTOMATIC DETECTOR DEVICE FOR A TIRE ASSEMBLING-DISASSEMBLING MACHINE

(75) Inventor: Tullio Gonzaga, Correggio (IT)

(73) Assignee: Butler Engineering & Marketing S.p.A., Rio Saliceto (IT)

( * ) Notice: Subject to any disclaimer, the term of this patent is extended or adjusted under 35 U.S.C. 154(b) by 0 days.

(21) Appl. No.: 11/101,225

(22) Filed: Apr. 7, 2005

(65) Prior Publication Data

US 2005/0241776 A1 Nov. 3, 2005

(30) Foreign Application Priority Data

Apr. 9, 2004 (IT) .......................... VR2004A0055

(51) Int. Cl.
*B60C 25/132* (2006.01)
*B60C 25/138* (2006.01)

(52) U.S. Cl. ..................................... 157/1.17; 157/1.28

(58) Field of Classification Search ................. 157/1.1, 157/1.11, 1.17, 1.21, 1.22, 1.24, 1.26, 1.28, 157/1.44, 14

See application file for complete search history.

(56) References Cited

U.S. PATENT DOCUMENTS

2004/0165180 A1* 8/2004 Voeller et al. ......... 356/139.09

FOREIGN PATENT DOCUMENTS

| DE | 2529343 A1 | 1/1977 |
| EP | 1479538 A | 11/2004 |
| JP | 06270619 A * | 9/1994 |

* cited by examiner

*Primary Examiner*—David B. Thomas
(74) *Attorney, Agent, or Firm*—Orum & Roth, LLC (57) ABSTRACT

An automatic detector device for a tire assembling-disassembling machine having at least one support group (G) mounted for rotation about an axis of rotation of a tired wheel (9) whose bead is to be released, and at least one bead-releasing roll-carrying extending-retracting arm ($T_1$, $T_2$). Each arm ($T_1$, $T_2$) can be extended and retracted and supports a respective bead-releasing roll ($R_1$, $R_2$). The arm ($T_1$, $T_2$) are located, in use, on opposite sides with respect to the tired wheel (9). The detector device further comprises a sensor member (3) movably supported at a respective bead-releasing roll ($R_1$, $R_2$), driving means (5) for each sensor member (3), so that it can be moved between a backward rest position and an extended working position, and control means (34) arranged to act in response to control signals generated by sensor member (3) in its working position.

14 Claims, 8 Drawing Sheets

AUTOMATIC DETECTOR DEVICE FOR A TIRE ASSEMBLING-DISASSEMBLING MACHINE

BACKGROUND OF THE INVENTION

1. Field of the Invention

The present invention relates to an automatic detector for tire assembling-disassembling machines, particularly, but not exclusively, suitable for tire assembling-disassembling machines using a pair of arms each carrying a tire bead-releasing roll.

2. Description of Related Art

As it is known, tire assembling-disassembling machines have already been proposed having one or more bead-releasing rolls, which are carried at the free end of a respective telescopic support arm, arranged on opposite sides with respect to a tired wheel to be disassembled, and suitable for being pressed against the wheel tire to simultaneously release the tire bead at the two sides of the wheel, while allowing the tired wheel to rotate around its axis of rotation.

In order to carry out a bead-releasing operation with a pair of bead-releasing rolls, the operator, while taking into account the size of the wheel rim, controls the pair of bead-releasing rolls so as to move them close to a respective edge of the wheel rim, by causing an extension or lengthening of their telescopic support arms. When each bead-releasing roll reaches an abutting position against its respective rim edge, the operator also controls mutual approaching or "clamping" movement, of the two telescopic arms and thus of the bead-releasing rolls carried by them, while simultaneously setting in rotation the wheel the tire bead of which is to be released. Clearly, if all the manoeuvres have been correctly carried out by the operator, the edge of the two bead-releasing rolls should rest against its respective tire side, while abutting against the rim edge of the tired wheel.

In conventional tire assembling-disassembling machines, power is then applied to the telescopic arms, whereby the bead-releasing rolls are forced to get near to each other, while the tired wheel is rotating to complete a so-called bead-releasing operation. With tired wheels in use at present, such a bead-releasing operation can be carried out only with difficulty, as wrong setting of the bead-releasing rolls by the operator can cause serious damages, especially to tires having a lower outline and mounted onto a light-alloy wheel rim.

With more recent tire assembling-disassembling machines, in order to obviate such a drawback the so-called "dynamic bead-releasing" has been adopted, in the releasing of the tire carried out while the tired wheel is rotated so that each bead-releasing roll is moved both towards the axis of rotation of the wheel and closer to the other roll, thereby penetrating between tire bead and wheel rim edge while sliding on the tire bead preferably following a zig-zag path, which imitates the shape of the inner collar of the wheel rim, and thus each bead-releasing roll presses at the very tire bead and not on a tire side portion relatively far from the tire bead.

The path followed by each bead-releasing roll after its positioning close to its respective edge of the wheel rim is thus a broken line roughly having a first length parallel to wheel axis of rotation, a second very short length inclined and directed towards the same axis, and a third length also parallel to the axis of the tired wheel.

To allow each bead-releasing roll to follow the above described broken path, a plurality of structural solutions have been proposed for tire assembling-disassembling machines, as it is known to a person skilled in the art.

A first solution was a tire assembling-disassembling machine provided with cams arranged to control the bead-releasing rolls to follow a predetermined broken path. Such a solution, however, owing to the fact that the path is predetermined and fixed, cannot be adopted for all at present commercially available types of tired wheel.

A second and easier solution is to cause the bead-releasing rolls to follow an approaching path along an arched line in its respective lying plane containing both its respective telescopic arm and the tired wheel axis of rotation, starting from the wheel rim edge towards the axis of rotation of the wheel. With this structure, however, the bead-releasing rolls could start pressing onto a length of the tire side rather than onto the bead, which, as it is known, is the most resistant portion of the tire and thus with. the risk of causing the tire to break or to become permanently damaged.

A further already suggested solution is that such a broken path is manually executed by an operator, thereby entrusting the success of the tire bead-releasing operation to the skill and ability of the operator, who has to be highly trained.

A last solution is to provide that the bead-releasing rolls, after contact with the tire, press a spring and control a suitable detector in order to start the broken path. This solution has serious drawbacks in so far as the deformation calibration of the detector is concerned. As a matter of fact, if one is dealing with a soft or easily yielding tire, it might occur that a bead-releasing roll, when the same is in contact with the tire side, fails to control the detector which results in no control for starting the broken path being generated. The two rolls then continue their approaching movement, while further pressure is applied onto the tire side, which can sometimes results in the tire been damage or even cut.

If instead one is dealing with a hard or too rigid tires, the bead-releasing rolls could control in advance the detector, even before starting deformation of the tire side, whereby a control to start the broken path is generated too early. In this case, each bead-releasing roll will be forced to slide onto the tire side until it steps or passes over the wheel rim edge, which might results in both the tire and the wheel rim being damaged, especially if the latter is made of a light alloy.

Finally, it should not be forgotten that in all the above described tire assembling-disassembling machines one of the two bead-releasing rolls cannot be seen by the operator during a standard tire bead-releasing procedure since it is hidden from sight by the tired wheel and this results in a further margin of uncertainty and error.

SUMMARY OF THE INVENTION

The main object of the present invention is to provide an automatic detector device for a tire assembling-disassembling machines that is suitable for eliminating or drastically reducing the above mentioned drawbacks.

Another object of the present invention is to provide an automatic detector device which makes it possible also for a not highly skilled operator to release a tire bead from a wheel rim edge, as the bead-releasing rolls are cause to follow an optimal bead-releasing path for each type of tired wheel in a simple and fast manner.

A further object of the present invention is to provide an automatic detector device for tire assembling-disassembling machines that can be installed in any type of tire assembling-disassembling machines provided with a pair of bead-releasing roll-carrying arms.

These and other objects that will better appear below are achieved by an automatic detector device according to the present invention for a tire assembling-disassembling machine having at least one rotatable support for a tired wheel, the tire bead of which is to be released from its wheel rim edge, at least one extendable-retractable bead-releasing roll-carrying arm, each arm supporting at least one respective bead-releasing roll and being located, in use, facing said tired wheel, said detector device being characterized in that it comprises at least one sensor member movably supported at a respective bead-releasing roll, driving means for each sensor member, whereby it is movable between a rest position and a extended working position, and control means designed to act in response to control signals generated by said sensor member in said working position.

BRIEF DESCRIPTION OF THE DRAWINGS

Further features and advantages of an automatic detector device according to the present invention will better appear from the following detailed description of some presently preferred embodiments thereof, given by way of non-limiting examples of carrying out the invention, with reference to the accompanying drawings, in which.

DESCRIPTION OF THE PREFERRED EMBODIMENTS

In the accompanying drawings, the same or similar parts or components have been indicated with the same reference numerals.

With reference first to FIGS. 1 to 11, it will be noted that a wheel assembling-disassembling machine has a bearing frame A with a base B from which a rear upright member C raises. Onto base B there is provided a rotatable assembly arranged to support a wheel rim or a tired wheel, e.g. comprising a table, which can rotate about a substantially vertical axis of rotation and is provided with jaws to engage a wheel rim, or a gripping head having a number of expansion arms G and also mounted for rotation about a substantially vertical axis.

Figure 1:
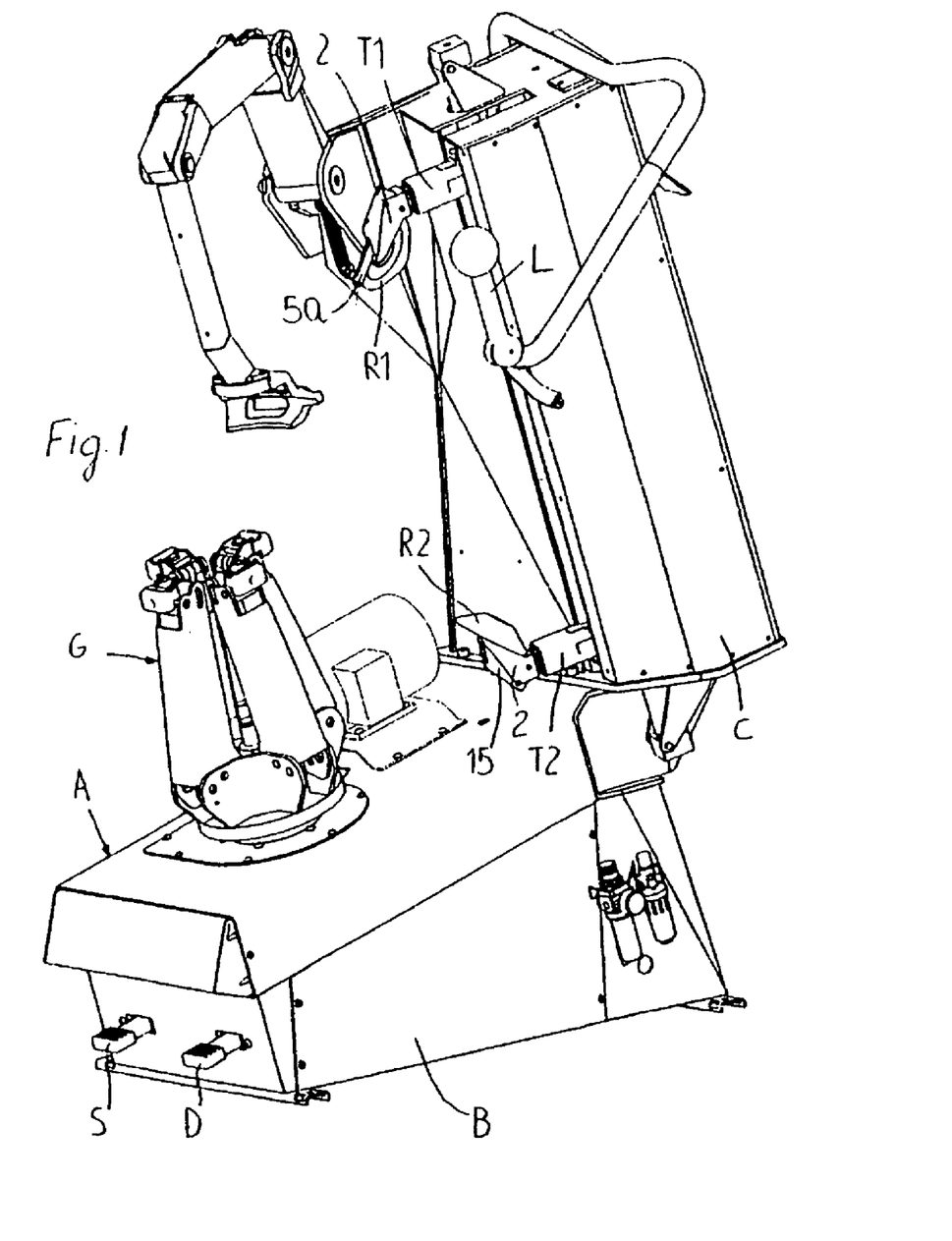
FIG. 1 shows a diagrammatic perspective view of a tire assembling-disassembling machine provided with a wheel support rotatable about a substantially vertical axis of rotation and a pair of telescopic bead-releasing roll-carrying arms: an upper arm and a lower arm.
Figure 2:
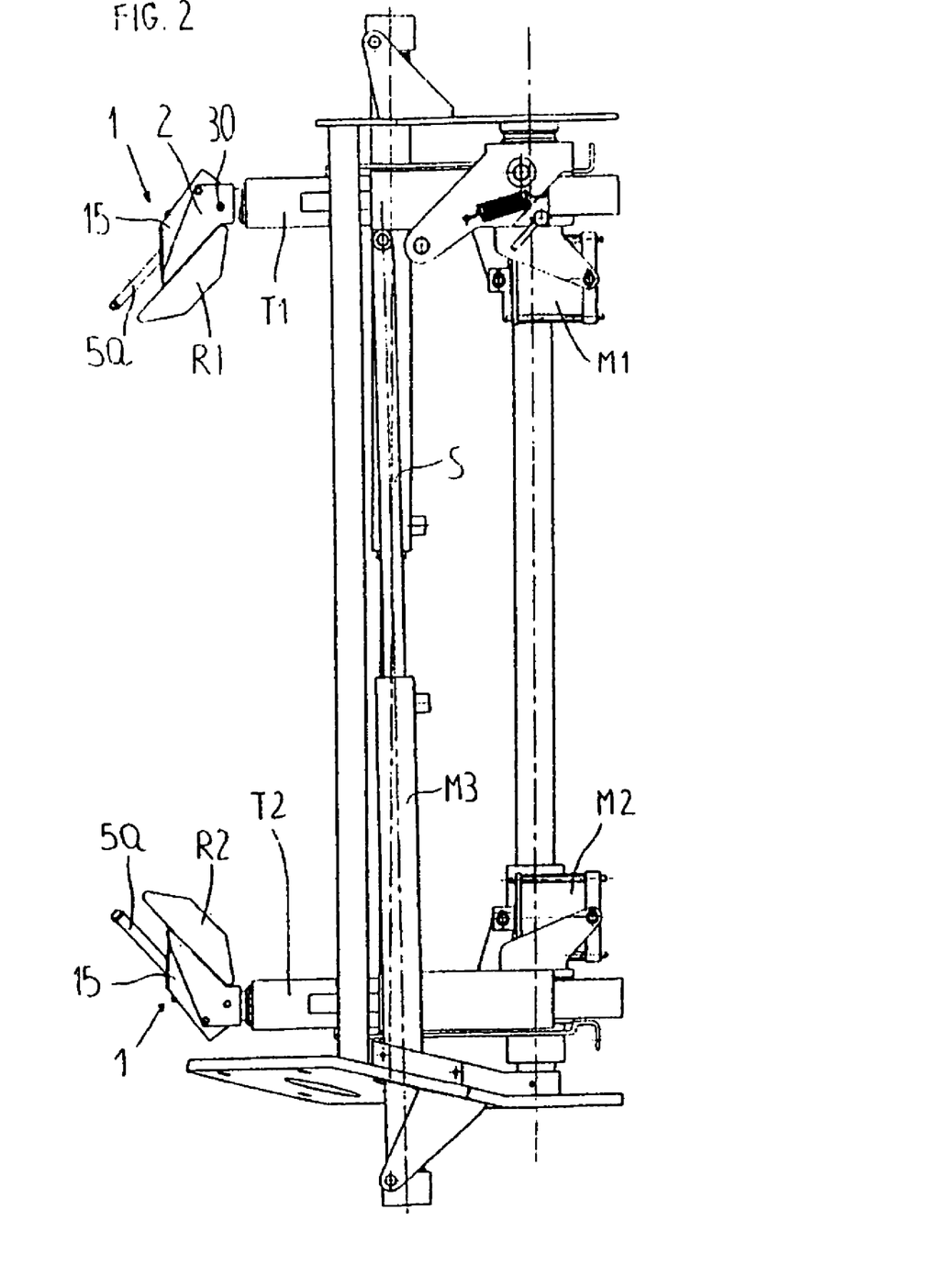
FIG. 2 illustrates a side elevation view of the pair of bead-releasing rolls of the tire assembling-disassembling machine of FIG. 1 provided with a respective driving assembly.
Figures 3, 3A, 4, 4A, 5:
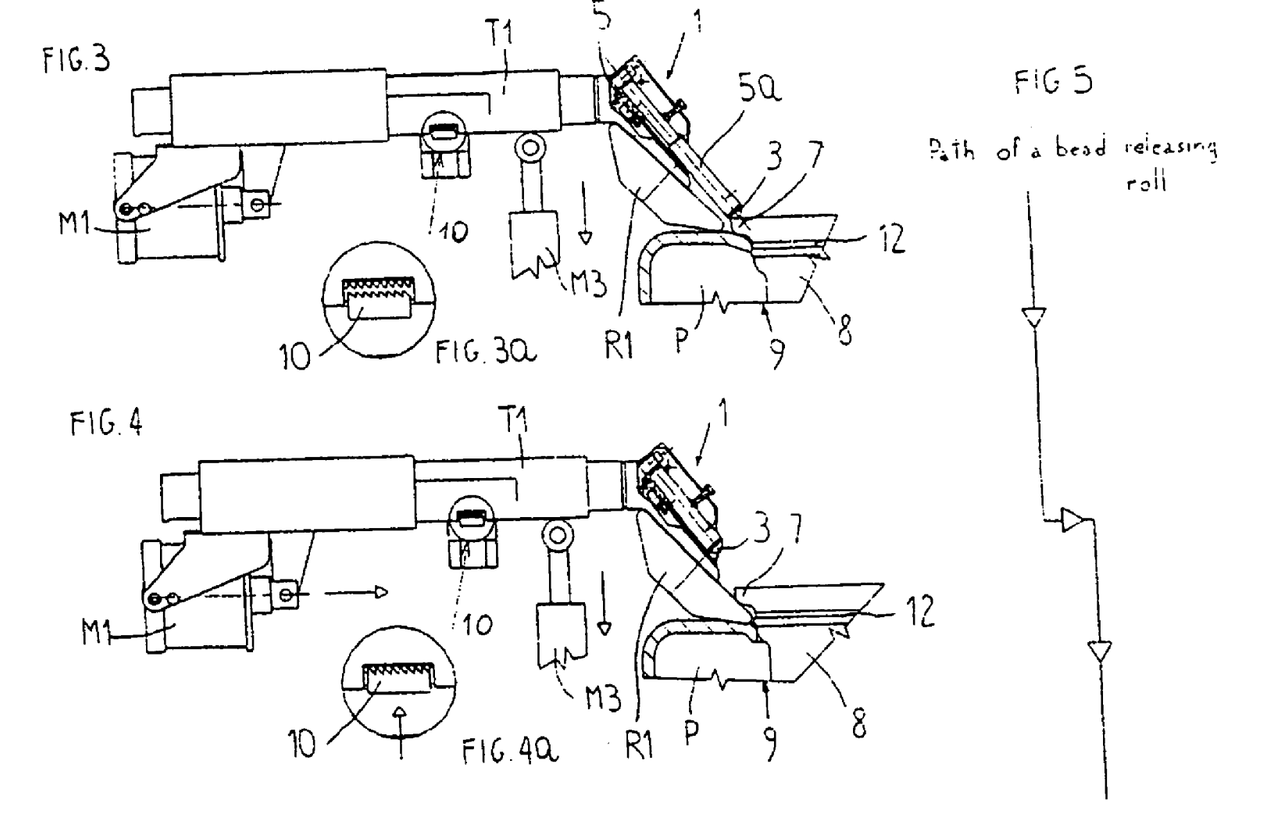
FIG. 3 shows an upper roll-carrying arm with portions in cross-section provided with an automatic detector device according to the present invention having its sensor member in an extended position abutting against the wheel rim edge of a tired wheel to be disassembled.
FIG. 3a illustrates a detail on an enlarged scale of the telescopic arm of FIG. 2.
FIG. 4 illustrates the roll-carrying arm of FIG. 3 with its sensor member in a back rest position.
FIG. 4a shows a detail of FIG. 3a but in a different working configuration.
FIG. 5 illustrates a diagram showing the working path of a bead-releasing roll provided with an automatic detector device according to the present invention.

At the rear upright member C a support and control assembly for a pair of overhangingly extending and retracting arms, e.g. an upper and a lower telescopic arm $T_1$ and $T_2$, which can expand and contract towards and away from gripping head G, each arm carrying a respective bead-releasing roll $R_1$ and $R_2$ at its free end. Arms $T_1$ and $T_2$ can be controlled, e.g. by means of a respective pneumatic jack $M_1$ and $M_2$, so as to extend and retract, as well as to be moved close to, and away from one another along more or one vertical guides S by a pneumatic jack $M_3$.

Each telescopic arm $T_1$ and $T_2$ is provided with a braking or blocking device 10 of any suitable type, which is controlled by an electronic control unit 34, as will be further described below.

Each bead-releasing roll $R_1$ and $R_2$ is usually frustoconical in shape and has a radiused edge at its greater base, and is idly mounted at the free front end of its respective roll-carrying arm $T_1$ and $T_2$, its axis of rotation being inclined, e.g. of about 45 degrees, with respect to the longitudinal axis of its respective roll-carrying arm, and thus its radiused edge all around its greater base abuts, in use, against edge 7 of the wheel rim 8 of a tired wheel 9 to be disassembled which is arranged on the rotatable table or grip head G, whereas its lateral surface rests against the tire bead, as it is known to a person skilled in the art.

According to the present invention, an automatic detector, generally designed at 1, is provided at each bead-releasing roll $R_1$ and $R_2$.

By acting on suitable controls, not shown in detail in drawings, and generically comprising a control lever L, on which a control button for jack $M_3$ can be provided, the operator causes the two roll-carrying arms $T_1$ and $T_2$ to extend or retract depending upon the diameter of tired wheel 9. In such a position, the arms $T_1$ and $T_2$ are arranged aligned in the direction of the axis of rotation of the tired wheel 9 at opposite sides with respect thereto, and their bead-releasing rolls $R_1$ and $R_2$ are each positioned close to a respective edge 7 of the wheel rim 8 of tired wheel 9.

Figures 9, 10:
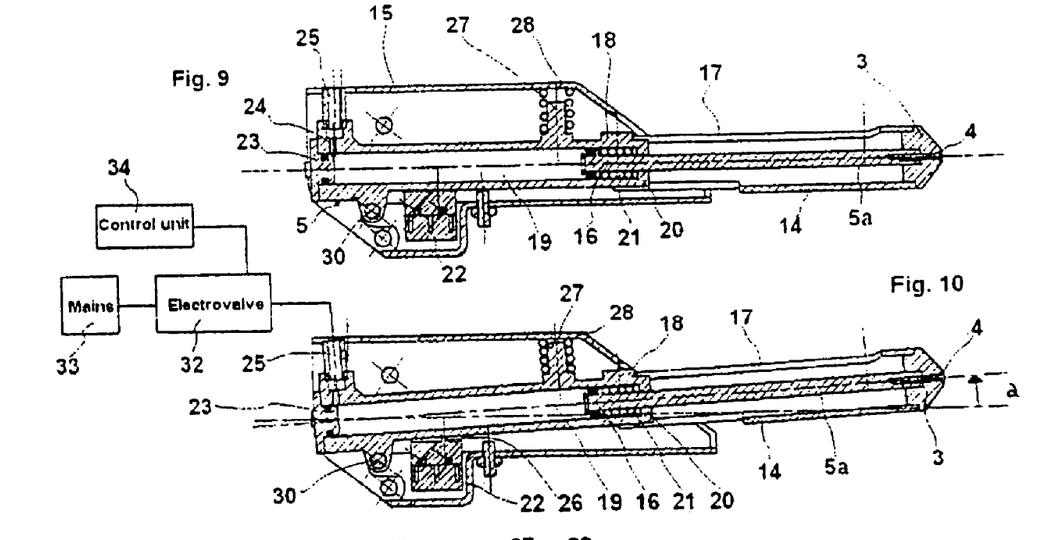
FIG. 9 illustrates a longitudinal section view of an automatic detector device according to the present invention in a first step of its trim in an extended working position thereof.
FIG. 10 illustrates a view similar to that of FIG. 9 but referring to a second step of its trim in an extended working position of the automatic detector device.
Figure 11:
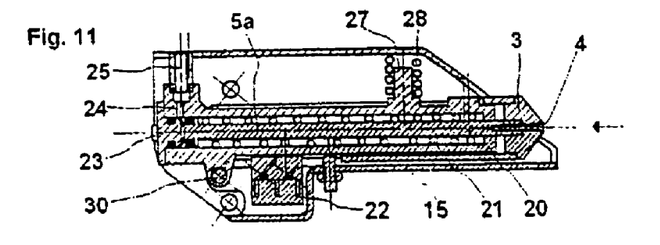
FIG. 11 shows a longitudinal section view of the automatic detector device of FIGS. 9 and 10 in a back rest position.

An automatic detector device 1 is provided for each bead-releasing roll $R_1$ and $R_2$ and located on opposite side with respect to the frustoconical surface of its respective bead-releasing roll $T_1$ or $T_2$. The overhanging end of each roll-carrying arm $T_1$ and $T_2$ typically carries a bracket 2, e.g. an U-shaped cross sectional bracket, to which a respective automatic detector device 1 is secured. An automatic detector device 1 comprises a sensor head 3 supported, e.g. secured by means of a screw 4, at the distal end of a rod-shaped member or finger 5a, which advantageously can be a piston-rod of a linear fluid-operated actuator 5. Linear actuator 5 also comprises a cylinder 19, in which a piston member 16 for controlling piston-rod 5a is slidingly mounted. Within cylinder 19 an helical return spring 21 is also provided, which at one end thereof abuts against piston member 16, whereas at its other end reacts against a bottom 20 of cylinder 19 (FIGS. 9 to 11).

Advantageously, a tubular member 14 is provided around to the rod-shaped member 5a, which assists in supporting sensor 3 at head thereof and has a longitudinal slit 17 designed to slidingly engage with an external projection 18 of cylinder 19, and thus tubular member 14 is guided during extension and retraction movements of the rod-shaped member or stem 5a and locked against amgular movements about its longitudinal axis.

At its end opposite to the end from which stem 5a extends, cylinder 19 is sealingly closed by means of a bottom 23 and is in fluid communication, e.g. through a transversal bore 24 and a conduit 25, with a suitable pressurized fluid (air) source 33 by means a shut-off electrovalve 32, which can be controlled in turn by an electronic control unit 34, such as an electronic board.

Preferably, cylinder 19 is housed in a supporting casing or box-like body 15. Near the end closed by the bottom 23, cylinder 19 is articulated to box-like body 15 by a pin 30, preferably carried by bracket 2, having its longitudinal axis extending transversely with respect to longitudinal axis of the cylinder, whereas at its other end away from pin 30 it is provided with a resilient return means, e.g. an helical spring 28, designed to act between cylinder 19 and internal wall of the box like body 15 and advantageously held in position by means of a lug 27 projecting either from cylinder 19 or box-like body 15.

With this structure, cylindrical body 19 is angularly displaceable about the transversal pin 30 between a rest position, e.g. with return spring 28 in a relaxed condition (FIGS. 9 and 11)i and a working position against the action of the return spring 28 (FIG. 10). Amplitude of angular movement of cylinder 19 has been indicated by angle $\alpha$ in FIG. 7.

Within box-like body 15 there is also provided a detector device 22 arranged to act in response to angular movement of cylinder 19 and thus of sensor 3 supported by it by means of stem 5a. By way of example, detector device 22 can comprise a suitable button switch or micro-switch, e. g. having its body fixed to the inner wall of the box-like body 15 and its button 26 facing the cylinder 19, whereby the switch opens an electronic control circuit, preferably electrically connected to the control unit 34 of the electrovalve 32, when cylinder 19 angularly moves through angle $\alpha$.

More specifically, when sensor 3 contacts edge 7 of rim 8 while the roll-carrying arm $T_1$ or $T_2$ gets near to the tired wheel 9, a tangential thrust onto sensor 3 is exerted, owing to the speed given to the automatic detector device 1 by the arm with respect to wheel-rim 8. Such a thrust is transmitted to the linear actuator 5 connected to sensor 3, thereby causing the linear actuator 5 to effeci a corresponding angular movemont about the pivot pin 30 through angle $\alpha$. The resulting operation of the micro-switch 22 causes the control unit 34 to act on electrovalve 32, which will set into communication conduit 25, and thus cylinder 19, with the environment, which results in the fluid pressure in cylinder 19 being decreased and piston 16 being thus moved back-owing to return spring 21. As shown, stem 5a will return into cylinder 19 (FIG. 11).

At the same time, stem 5a is not longer subjected to the thrust which has caused it to rotatethrough an angle $\alpha$, as its return movement into cylinder 19 has started, and thus its disengagement from edge 7 of wheel-rim has begun. Owing to the return spring 29, cylinder 19 is caused to pivot about pin 30, thereby returning to its rest position as illustrated in FIG. 11.

The operation of the above described automatic detector device 1 is rather simple. Bead-releasing rolls $R_1$ and $R_2$ mounted on the respective roll-carrying arm $T_1$ and $T_2$, when the operator acts onto the lever L, are first caused to get near the respective edge 7 of the wheel-rim 8 until sensor 3 abuts against edge 7 of wheel-rim 8 thus detecting the presence thereof.

This fact results in sending one or more suitable control signals to the control unit 34 which starts the following sequence of operations:

Moving backwards the stem of the linear actuator 5 to its rest and protection position into the cylinder 19, mutual slowed down approaching movement of roll-carrying arms $T_1$ and $T_2$ which results in a clamping action being exerted onto the tired wheel 9 by the hydraulic jack $M_3$ in order to prevent damaging tire 12, energizing pneumatic jacks $M_1$ and $M_2$ to cause its respective roll-carrying arm $T_1$ or $T_2$ to be extended, thereby moving forward the arm in the direction of the axis of rotation of tired wheel 9, so that the combined action of two orthogonal movements, i. e. extension and mutual approaching movements, of roll-carrying arms $T_1$ and $T_2$ causes its respective bead-releasing roll $R_1$, $R_2$ to be inserted between edge 7 of the wheel-rim and the bead of tire P until its rounded edge reaches the intermediate band 12 of wheel-rim 8 (FIG. 4), which has a smaller diameter than the respective edge 7, de-energizing of jacks $M_1$ and $M_2$, and simultaneous locking of roll-carrying arms $T_1$ and $T_2$ owing to coming into action of a respective brake 10, thereby locking each roll-carrying arm in the reached extended position before its respective bead releasing roll has reached the band 12 of the wheel-rim 8 of the tired wheel 9.

At this point, the operator, while acting upon a suitable pedal S, energizes a motor, which causes the grip head G to rotate in order to carry out a complete bead-releasing operation all along the tire, as in a conventional wheel assembling-disassembling machine.

Figure 6:
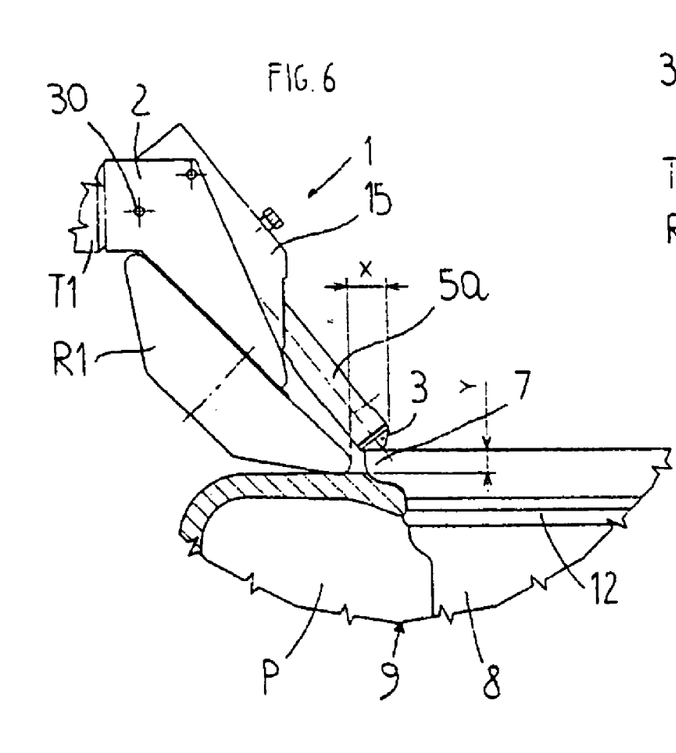
FIG. 6 is a side view on an enlarged scale of an automatic detector device according to the present invention mounted at a correctly positioned bead-releasing roll abutting against the wheel rim of a tired wheel to be disassembled, whereas the sensor member is in its extended working position abutting against the outer side of the wheel rim edge.

In FIG. 6 an automatic detector device 1 housed on a bead-releasing roll $R_1$ is shown which has, in use, its stem 5a projecting from main body 15 and extending above and at the back of bead-releasing roll $R_1$ from which it is offset through a length "X", but at a different level "Y" in a direction parallel to the axis of rotation of the tired wheel 9.

With this arrangement, while roll-carrying arm $T_1$ is approaching tired wheel 9, sensor 3 is located outside the overall dimensions of its respective bead-releasing roll $R_1$, thereby detecting the position of the edge 7 of wheel-rim 8 and starting then the above described sequence of operations.

At the same time, bead-releasing roll $R_1$, being located in a backward position by a length "X" and thus nearer by a distance "Y" to the side of tire P than the sensor 3, rests onto the edge 7 of rim 8, thereby being ready to start the above mentioned sequence of operations.

Figure 7:
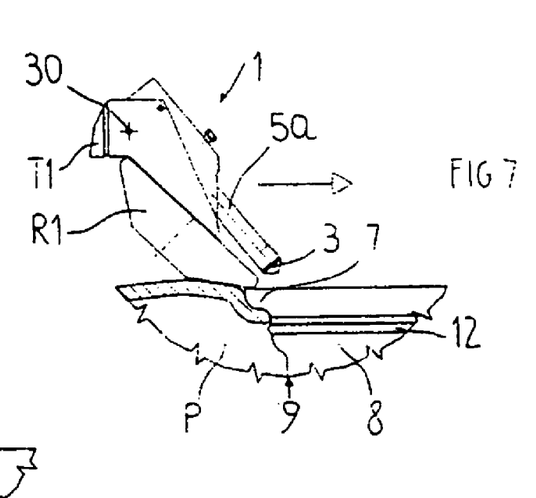
FIG. 7 is a view similar to that of FIG. 6, but with a erroneously positioned bead-releasing roll abutting against the outer side of the wheel rim edge, whereas the sensor member is in its extended position, not abutting against the wheel rim edge side yet.
Figure 8:
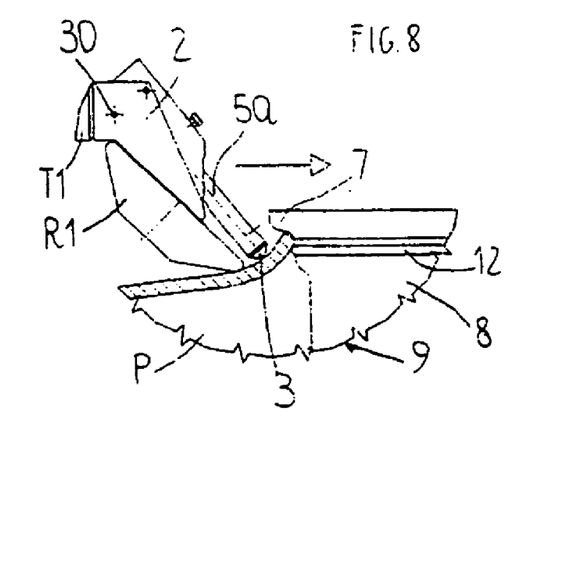
FIG. 8 shows a view similar to that of FIG. 6, wherein both bead-releasing roll and sensor member erroneously abut against the tire side of the tired wheel.

In FIGS. 7 and 8, a bead-releasing roll $R_1$ of a tire assembling-disassembling machine is illustrated, which is erroneously located with respect to the edge 7 of the wheel-rim 8, e.g. owing to wrong setting of the bead-releasing roll with respect to the diameter of the tyred wheel 9, with consequent altered arrangement of roll-carrying arms $T_1$ and $T_2$.

As it will be noted in FIG. 7, roll-carrying arm $T_1$ is located in such a way that its respective bead-releasing roll $R_1$, while approaching tired wheel 9, comes to rest onto the side of wheel-rim 8 instead of abutting against the side of tire P in the proximity of edge 7.

In this way, sensor 3 cannot detect the presence of edge 7 of wheel-rim 8, and thus no signal is generated for starting bead-releasing steps.

In this construction, sensor 3 will not be able to detect the presence of the edge 7 of rim 8 and consequently it will not be able to send any signal to the control unit 34 for activating bead-releasing step.

In FIG. 8, roll-carrier arm $T_1$ is located such that the respective bead-releasing roll $R_1$ rests onto the side of tire P, but not abutting the edge 7 of rim 8, while it being approached tired wheel 9. In this way, sensor 3 is not capable to detect the presence of edge 7 of rim 8 and thus it does not send any signal for starting bead-releasing steps.

Figure 12:
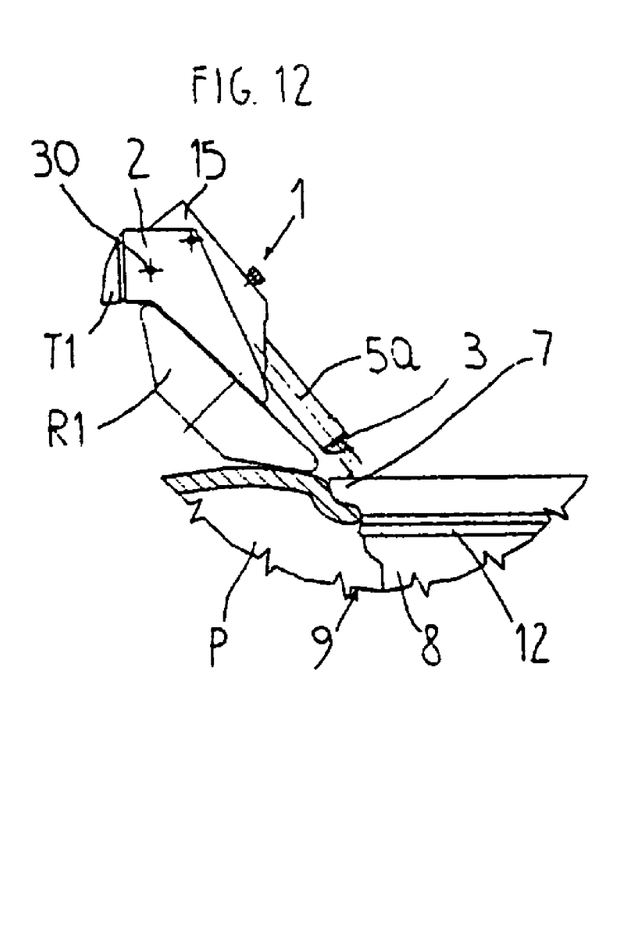
FIG. 12 is a side view of another embodiment of an automatic detector device mounted at a bead-releasing roll while abutting against the wheel rim edge of a tired wheel to be disassembled, whereas the sensor member is not of mechanical type.
Figure 13:
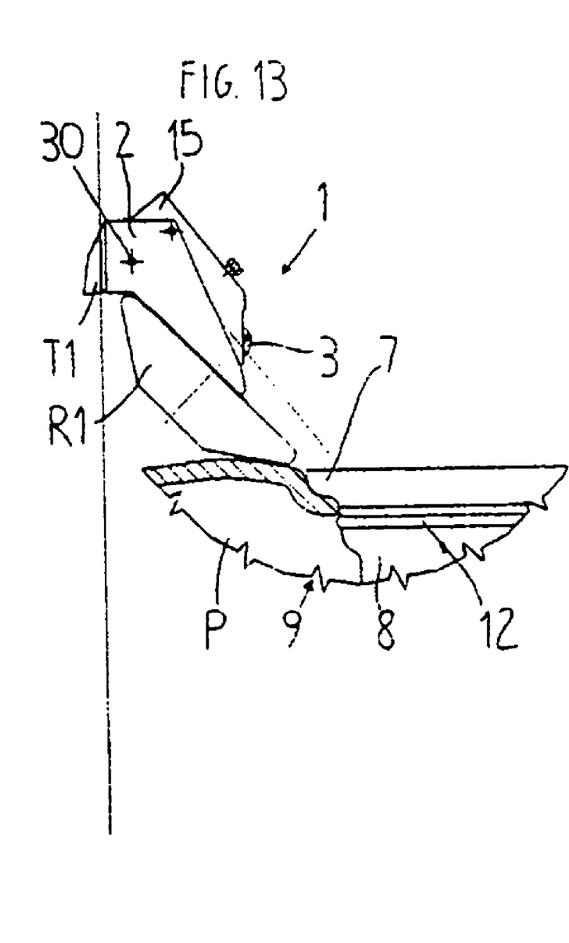
FIG. 13 illustrates a side view of the automatic detector device of FIG. 12 while the extended position of the linear actuator is been withdrawn.

FIGS. 12 and 13 illustrate a variant of an automatic detector 1 comprising a not mechanical sensor 3, e.g. an optical or inductive capacitive sensor, which is always housed onto the distal end of the stem 5a of the linear actuator 5.

In this variant sensor 3 after having detected the presence of edge 7 of rim 8, e.g. through a laser or a magnetic field difference, sends a signal to the control unit 34, which in turn pilots the solenoid valve 32, with consequent retraction of stem 5a of the linear actuator 5 into cylinder 19, without any angular range about an articulation pin 30 and start of the bead-releasing sequence of the tired wheel 9 by wheel assembling-disassembling machine.

Figure 14:
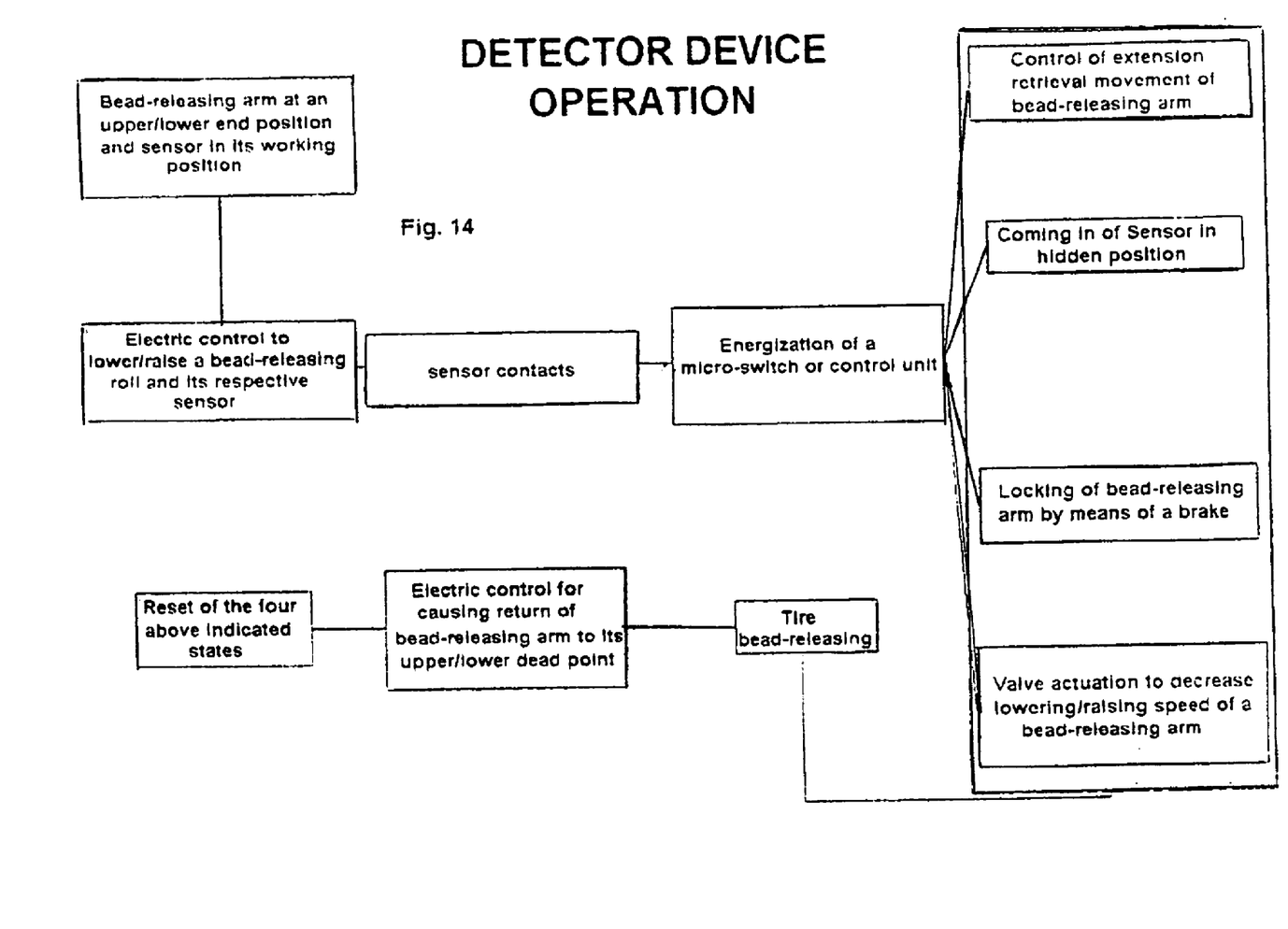
FIG. 14 shows a block diagram of the working sequence of the wheel assembling-disassembling machine of FIG. 1 provided with an automatic detector device according to the present invention.

In FIG. 14 a block diagram of the operational sequence of a working cycle of a wheel assembling-disassembling machine using roll-carrier arms $T_1$ and $T_2$ provided with respective automatic detector 1 according to the present invention for bead-releasing tires P is illustrated. Initially, roll-carrier arms $T_1$ and $T_2$ are located by the operator opposite aligned at two sides of a tired wheel 9 acting on lever L, whereby stems 5a of linear actuators 5 are extended in their working position.

The operator will therefore always control, through lever L, the two roll-carrier arms $T_1$ and $T_2$ to move in contact with the two sides of the tire P, therefore beginning the "tongs" movement of roll-carrier arms $T_1$ and $T_2$ until sensors 3 located onto the ends of stems 5a detect, e.g. abut against edge 7 of rim 8. In this moment, sensor 3 sends a suitable signal, which can be electrical, mechanical, electromechanical, or optical as above described to the control unit 34, which in turn will activate a sequence of cascade operations, as above described, until occurred bead-releasing of tire P by means of wheel assembling-disassembling machine.

Subsequently, the operator will manually give the consent for coming back forwards their rest position the two roll-carrier arms $T_1$ and $T_2$ and then resetting in their working position the respective linear actuators 5.

Each action as above described will be able to be carried out either automatically, through a suitable program written in the control unit 34 or in a totally manual manner to permit the operator to control, in a more or less pushed way, operations carried out by wheel assembling-disassembling machine.

A control can be advantageously carried out on the resetting or not of stems 5a of the linear actuator 5, on coming back in a rest position of the roll-carrier rolls $T_1$ and $T_2$, on the closing tongs movement of the roll-carrier arms $T_1$ and $T_2$, on the actuation of the jack $M_1$ and the like.

Figure 15:
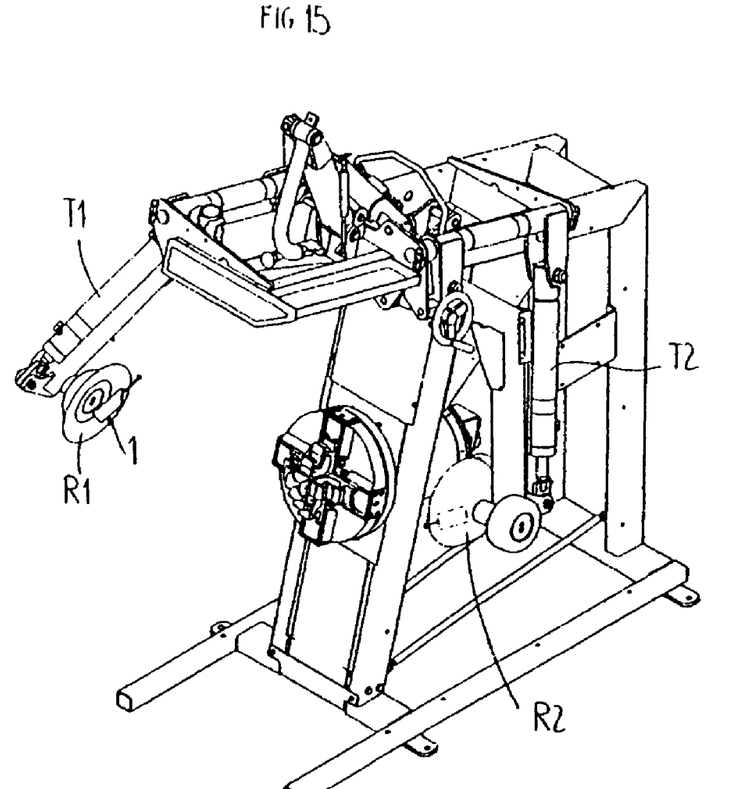
FIG. 15 illustrates slightly from the top a perspective view of a wheel assembling-disassembling machine provided with a wheel support having a substantially horizontal-axis of rotation with respect to a pair of lateral roll-carrying arms provided with an automatic detector device according to the present invention seated within each bead-releasing roll.
Figure 16:
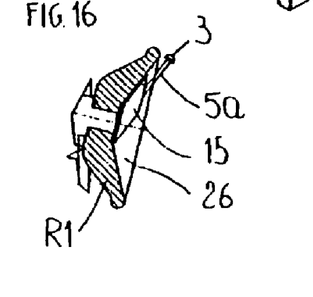
FIG. 16 shows a sectional view on an enlarged scale of a detail of the linear detector device of FIG. 15 according to the present invention.

FIGS. 15 and 16 illustrate another embodiment of wheel assembling-disassembling machine, in which automatic detectors 1 are located into an axial notch 26 of a respective bead-releasing roll $R_1$ and $R_2$, so that in its rest position, i.e. with stem 5a retracted into the cylinder 19, the automatic detector 1 is all contained within the overall dimensions of the respective bead-releasing roll $R_1$, $R_2$.

The automatic detector as above described is susceptible to numerous modifications and variations within the scope as defined by the claims.

So, for example, sensor 3 can be of mechanical detector type answering to a predetermined stress of optical type, capacitive type, or the like.

Linear actuator 5, rather than of dynamic fluid type, for example can comprise an endless screw or a rack actuated through a reversible motor.

Moreover, when a linear actuator 5 provided with an electric motor is used, the solenoid valve 32 will be replaced by a switch or the like.

The invention claimed is:

1. An automatic detector device for wheel assembling-disassembling machine comprising at least one support group mounted for rotation about an axis of rotation of a tired wheel the tire to be released, at least one extending-retracting, bead-releasing roll-carrying arm supporting at least one respective bead-releasing roll and said arm being located in use, on an opposite sides with respect to said tired wheel, and at least one sensor member movably supported at a respective bead-releasing roll, driving means for each sensor member, whereby said sensor member can be moved between a backward rest position and an extended working position, and a control means arranged to act in response to control signals generated by said sensor member in its working position.

2. A detector device as claimed in claim 1, wherein said driving means comprises at least one linear actuator having a rod-shaped component designed to support a respective sensor member and controlled by a respective linear actuator, thereby moving between said extended working position and said backward rest position.

3. A detector device as claimed in claim 1, further comprising a support member or casing for said driving means.

4. A detector device as claimed in claim 3, wherein said support member is located at a respective bead-releasing roll.

5. A detector device as claimed in claim 1, wherein said sensor member is a mechanical sensor.

6. A detector device as claimed in claim 5, further comprising an articulation and resilient return means arranged between a support member or casing and its respective driving means.

7. A detector device as claimed in claim 6, further comprising switch means arranged to act in response to an angular movement between said support member and said driving means thereby sending signals to said electronic control unit.

8. A detector device as claimed in claim 1, wherein said sensor member is an optical sensor.

9. A detector device as claimed in claim 1, wherein said sensor member is a capacitive or inductive sensor.

10. A detector device as claimed in claim 1, wherein said electronic control unit is designed to receive at least one control signal from said sensor member, when the sensor member abuts against an edge of wheel-rim of said tired wheel.

11. A detector as claimed in claim 1, wherein said electronic control unit is arranged to start an operation sequence comprising:
   returning of said rod-shaped component to its rest position,
   controlling a composite movement including approaching movement of said roll-carrier arm and forward movement towards said axis of rotation,
   setting in rotation of said rotating support group and locking said roll-carrying arm.

12. A detector device as claimed in claim 2, wherein said rod-shaped component of said linear actuator is kept in its extended working position by a control member.

13. A detector device as claimed in claim 12, wherein said control member is an electrovalve.

14. A detector device as claimed in claim 12, wherein said control member is a switch.

* * * * *